Sept. 30, 1952     F. A. KOESTER     2,612,289

AUTOMOBILE CRANKCASE OIL DRAINING APPARATUS

Filed April 6, 1950     2 SHEETS—SHEET 1

INVENTOR.
FREDERICK A. KOESTER,
BY Lyon & Lyon
attorneys

Sept. 30, 1952   F. A. KOESTER   2,612,289
AUTOMOBILE CRANKCASE OIL DRAINING APPARATUS
Filed April 6, 1950   2 SHEETS—SHEET 2

INVENTOR.
FREDERICK A. KOESTER
BY Lyon & Lyon
attorneys

Patented Sept. 30, 1952

2,612,289

UNITED STATES PATENT OFFICE 2,612,289

AUTOMOBILE CRANKCASE OIL DRAINING APPARATUS

Frederick A. Koester, Los Angeles, Calif.

Application April 6, 1950, Serial No. 154,239

4 Claims. (Cl. 222—51)

My invention relates to oil removing apparatus for automobile crankcases. Heretofore, in order to drain oil from an automobile crankcase, it has been the custom to run the automobile on a grease rack. This involves considerable time and trouble and requires, for reason of safety, that the passengers leave the vehicle. Attempts have been made to pump out the crankcase oil, utilizing the oil filler tube, to avoid under-the-car operation; however, such apparatus has been expensive and cumbersome to use.

An object of my invention is to provide an oil removing apparatus which may be wheeled into position beside a vehicle and withdraw the oil through the filler tube into a collector tank.

A further object is to provide an oil removing apparatus wherein the filler tank is subjected only to negative pressures while the crankcase is filled, the negative pressure being created by an air aspirator operated by the compressed air always available at service stations.

A still further object is, to provide an apparatus of this class wherein flow of oil may be observed and warning is given when the collector tank approaches a full condition.

A further object is to provide in an apparatus of this class, means utilizing the air aspirator and manual control, whereby a moderate amount of pressure may be applied to the collector tank when it is desired to empty the tank, such means being fool proof in that excessive pressure cannot be applied.

With the above and other objects in view as may appear hereinafter, reference is made to the accompanying drawings, in which.

Figure 1:
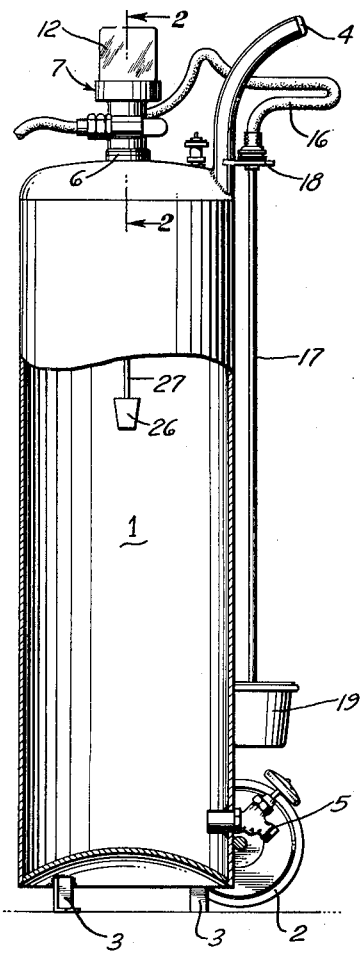
Figure 1 is a partial sectional partial elevational view of my oil removing apparatus.
Figure 2:
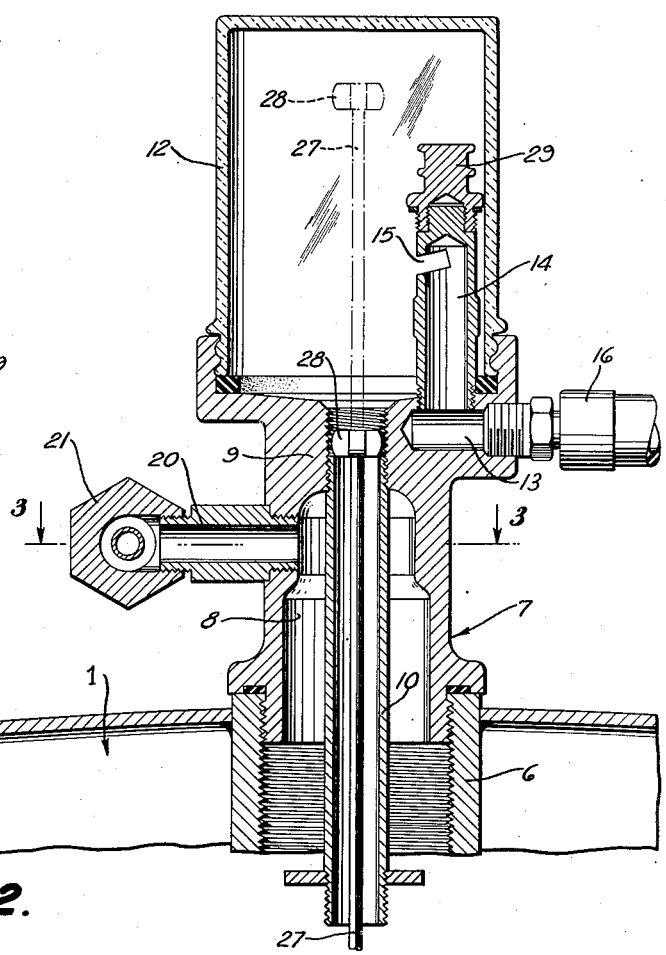
Figure 2 is an enlarged fragmentary sectional view thereof, taken through 2—2 of Figure 1, showing the apparatus arranged for the withdrawal of crankcase oil.
Figure 3:
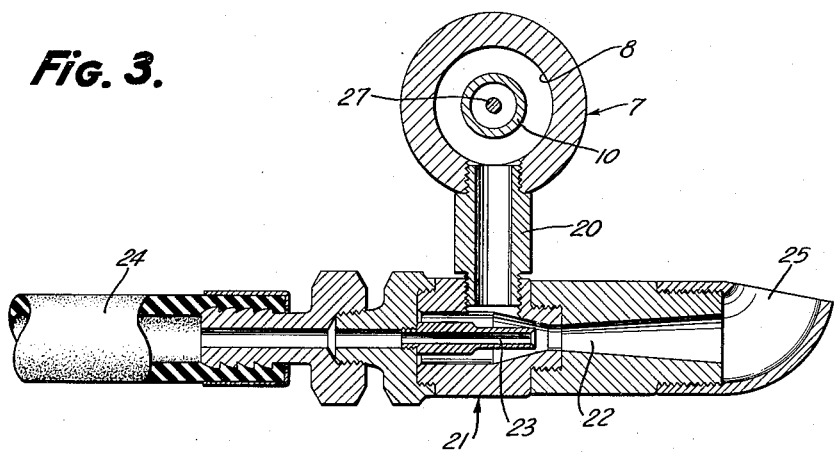
Figure 3 is a sectional view thereof, through 3—3 of Figure 2, showing the aspirator.

My oil removing apparatus for automobile crankcases includes a collector tank 1, of sufficient size to accommodate the crankcase oil from several engines. The tank is equipped with a pair of wheels 2 and feet 3, so that it may be wheeled from place to place and stood on end. The top of the tank is closed and provided with a suitable handle 4. Near the bottom of the tank is a drain spout 5.

Centered on the top of the tank is an internally threaded collar 6 which receives the lower end of a manifold or body member 7. The manifold is provided with a recess 8 in its lower end communicating with the interior of the tank. Above the recess, the manifold is constricted, as indicated by 9, to form an internally threaded bore. Threaded in the constriction is a depending tube 10 which projects a short distance into the tank 1.

The upper end of the manifold is enlarged and internally threaded to receive a transparent shell or dome 12. The enlargement may be so arranged that a conventional glass jar may serve as the transparent shell. The upper portion of the manifold 7 is provided with an intake port 13 which communicates with an intake tube 14 directed upwardly into the shell 12 and provided with a discharge slot 15. The intake port 13 communicates with an intake line 16 which in turn is attached to a tube 17 for insertion into the crankcase of an automobile engine through the oil filler tube. When not in use, the tube 17 is supported by a bracket 18 and drains into a cup 19 supported at the side of the tank 1.

The manifold 7 is provided with a laterally directed nipple 20 which communicates with the recess 8. The extended end of the nipple is joined to an aspirator body structure 21 which defines a Venturi bore 22. Directed into the Venturi bore is an air jet 23 connected by suitable fittings to an air supply line 24. The extremity of the aspirator body 21 is provided with a nozzle 25, preferably curving laterally from the Venturi bore and so arranged that it may be readily covered by the palm of one's hand, for purposes which will be brought out hereinafter.

The tank 1 is equipped with a float 26 to which is attached a stem 27 extending upwardly through the tube 10. The upper end of the stem is provided with an indicator 28, preferably a cross member, so as to minimize interference with flow downwardly through the tube 10. The indicator 28 is adapted to raise into the transparent shell 12 and become visible when the tank is full or is almost full.

Removably screw threaded on the upper extremity of the intake tube 14 is a screw plug 29 which is also threaded for insertion into the constriction 9, so as to close off communication between the shell 12 and the interior of the tank.

Operation of my oil removing apparatus is as follows:

The tank is placed beside a vehicle and the tube 17 is inserted into the oil filler tube of the vehicle engine. An air supply is then connected to the aspirator so that air issuing from the jet 23 creates a vacuum in the recess 8, the tank 1, and the transparent jar 12. This causes oil to flow from the crankcase into the shell 12, through the slot 15, then downwardly through the tube 10 into the tank 1. During this operation, the condition and quality of oil removed can be observed.

Figure 4:
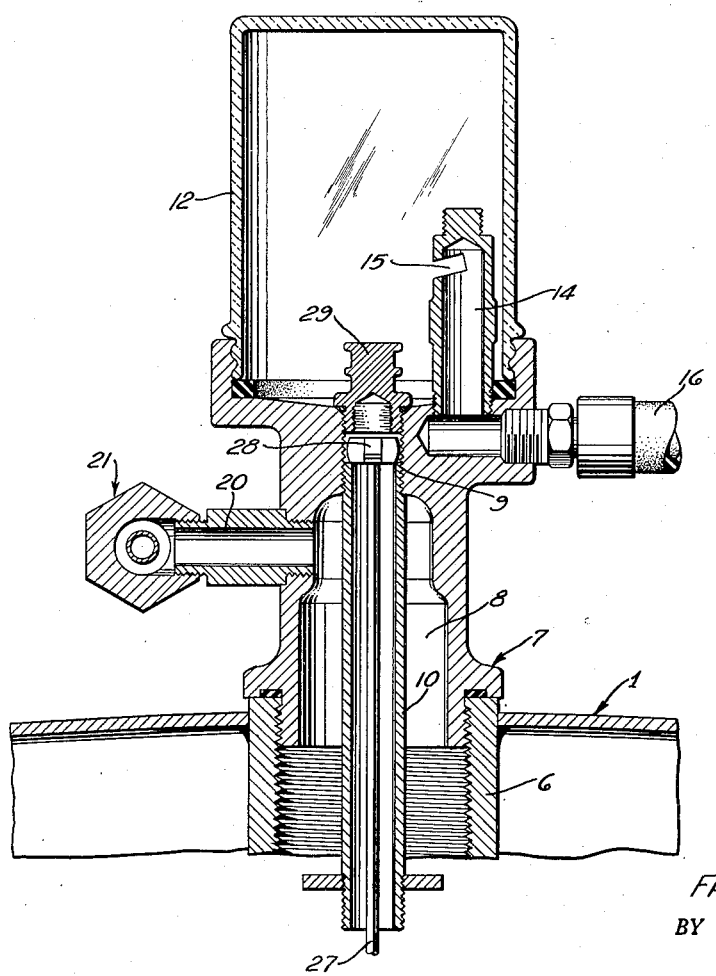
Figure 4 is a sectional view similar to Figure 2 but showing the apparatus arranged for discharging or draining oil from the collector tank.

The tank is of sufficient size to receive the oil from several engines. When the flow indicator 28 indicates that the tank is filled to the desired capacity, the tank may be emptied by means of the drain spout 6. To facilitate emptying, or to permit discharge of the contents of the tank into another container which may be elevated, a hose may be connected to the drain spout 5 and pressure applied to the interior of the tank. This is accomplished, as shown in Figure 4, by placing the plug 29 into the constriction 9. Air is then discharged through the aspirator, but in this case the hand is placed over the nozzle 25 so that a nominal back pressure may be created in the tank 1, so as to force the oil therefrom. It will be noted that by using one's hand to close the nozzle 25, it is impossible to build up any dangerous pressure in the tank 1. Furthermore, this arrangement gives full control to the operator to minimize the danger of spillage or too rapid a flow from the spout 5. It will be observed that the transparent shell must be removed in order to utilize back pressure, thus it is virtually impossible for one to apply pressure to the interior of the shell 12 such as might cause its breakage.

Having fully described my invention, it is to be understood that I do not wish to be limited to the details herein set forth, but my invention is of the full scope of the appended claims.

I claim:

1. An oil removing apparatus for automobile crankcases, involving: a tank; a body member affixed to the top of said tank; said body member having a vertical bore constriction, and a vacuum port below said constriction; an intake conduit communicating with said oil port and adapted to be inserted in the crankcase of a vehicle; a tube secured in said constriction and extending into said tank; an aspirator having a vacuum inlet communicating with said vacuum port to create a vacuum in said tank; a transparent dome covering the upper end of said body member whereby said oil port is subjected by reason of communication through said tube to the vacuum pressure in said tank.

2. An oil removing apparatus for automobile crankcases, involving: a tank; a body member affixed to the top of said tank, said body member having a vertical bore constricted adjacent its upper end, an oil port above said constriction, and a vacuum port below said constriction; an intake conduit communicating with said oil port and adapted to be inserted in the crankcase of a vehicle; a tube secured in said constriction and extending into said tank; an aspirator having a vacuum inlet communicating with said vacuum port to create a vacuum in said tank; a transparent dome covering the upper end of said body member whereby said oil port is subjected, by reason of communication through said tube, to the vacuum pressure in said tank; a drain outlet for said tank; and a safety seal means for said tube accessible only on removal of said dome to permit pressuring of said tank to drain oil therefrom.

3. An oil removing apparatus for automobile crankcases, involving: a tank; a body member affixed to the top of said tank, said body member having a vertical bore constricted adjacent its upper end, an oil port above said constriction, and a vacuum port below said constriction; an intake conduit communicating with said oil port and adapted to be inserted in the crankcase of a vehicle; a tube secured in said constriction and extending into said tank; an aspirator having a vacuum inlet communicating with said vacuum port to create a vacuum in said tank; a transparent dome covering the upper end of said body member whereby said oil port is subjected by reason of communication through said tube to the vacuum pressure in said tank; and a signal member movable in said tube and visible through said dome to indicate that said tank is full.

4. An oil removing apparatus for automobile crankcases, involving: a tank; a body member affixed to the top of said tank, said body member having a vertical bore constricted adjacent its upper end, an oil port above said constriction, and a vacuum port below said constriction; an intake conduit communicating with said oil port and adapted to be inserted in the crankcase of a vehicle; a tube secured in said constriction and extending into said tank; an aspirator having a vacuum inlet communicating with said vacuum port to create a vacuum in said tank; a transparent dome covering the upper end of said body member whereby said oil port is subjected by reason of communication through said tube to the vacuum pressure in said tank; a drain outfit for said tank; a safety seal means for said tube accessible only on removal of said dome to permit pressuring of said tank to drain oil therefrom; and a discharge nozzle for said aspirator adapted to be closed by the palm of one's hand to pressurize said tank.

FREDERICK A. KOESTER.

REFERENCES CITED

The following references are of record in the file of this patent:

UNITED STATES PATENTS

| Number | Name | Date |
|---|---|---|
| 1,393,272 | Dutton | Oct. 11, 1921 |
| 1,955,169 | Bertschinger | Apr. 17, 1934 |